US011396691B2

(12) United States Patent
Sohn et al.

(10) Patent No.: US 11,396,691 B2
(45) Date of Patent: Jul. 26, 2022

(54) ALLOY-PLATED STEEL MATERIAL HAVING EXCELLENT CORROSION RESISTANCE AND HIGH SURFACE QUALITY

(71) Applicant: POSCO, Pohang-si (KR)

(72) Inventors: Il-Ryoung Sohn, Gwangyang-si (KR); Jong-Sang Kim, Gwangyang-si (KR); Tae-Chul Kim, Gwangyang-si (KR); Jung-Kuk Kim, Gwangyang-si (KR)

(73) Assignee: POSCO, Gyeongsangbuk-do (KR)

( * ) Notice: Subject to any disclaimer, the term of this patent is extended or adjusted under 35 U.S.C. 154(b) by 438 days.

(21) Appl. No.: 16/471,238

(22) PCT Filed: Dec. 22, 2017

(86) PCT No.: PCT/KR2017/015331
§ 371 (c)(1),
(2) Date: Jun. 19, 2019

(87) PCT Pub. No.: WO2018/117732
PCT Pub. Date: Jun. 28, 2018

(65) Prior Publication Data
US 2020/0377989 A1 Dec. 3, 2020

(30) Foreign Application Priority Data
Dec. 22, 2016 (KR) .................. 10-2016-0177196

(51) Int. Cl.
*C23C 2/06* (2006.01)
*C23C 2/26* (2006.01)
(Continued)

(52) U.S. Cl.
CPC ............... *C23C 2/06* (2013.01); *B32B 15/01* (2013.01); *B32B 15/013* (2013.01); *B32B 15/04* (2013.01);
(Continued)

(58) Field of Classification Search
CPC ......... C23C 30/00; C23C 30/005; C23C 2/06; C23C 2/02; C23C 2/26; C23C 2/40;
(Continued)

(56) References Cited

U.S. PATENT DOCUMENTS 6,465,114 B1 * 10/2002 Honda ................. C23C 2/06
428/659
2009/0297881 A1 12/2009 Maalman et al.
(Continued)

FOREIGN PATENT DOCUMENTS

IN 653CHENP2014 10/2014
JP 2002285311 10/2002
(Continued)

OTHER PUBLICATIONS

International Search Report—PCT/KR2017/015331 dated Mar. 30, 2018.
(Continued)

*Primary Examiner* — Michael E. La Villa
(74) *Attorney, Agent, or Firm* — Cantor Colburn LLP

(57) ABSTRACT

Provided is an alloy-plated steel material that can be used in home appliances, automobiles, and construction materials and the like and, more particularly, to an alloy-plated steel material having excellent corrosion resistance and high surface quality.

4 Claims, 3 Drawing Sheets

(51) Int. Cl.
    *C23C 2/02*     (2006.01)
    *C22C 38/00*     (2006.01)
    *C22C 18/04*     (2006.01)
    *C22C 18/00*     (2006.01)
    *C23C 2/40*     (2006.01)
    *B32B 15/01*     (2006.01)
    *B32B 15/18*     (2006.01)
    *C23C 30/00*     (2006.01)
    *B32B 15/04*     (2006.01)

(52) U.S. Cl.
    CPC ............ *B32B 15/043* (2013.01); *B32B 15/18* (2013.01); *C22C 18/00* (2013.01); *C22C 18/04* (2013.01); *C22C 38/00* (2013.01); *C23C 2/02* (2013.01); *C23C 2/26* (2013.01); *C23C 2/40* (2013.01); *C23C 30/00* (2013.01); *C23C 30/005* (2013.01); *Y10T 428/12799* (2015.01); *Y10T 428/12951* (2015.01); *Y10T 428/12972* (2015.01); *Y10T 428/12993* (2015.01)

(58) Field of Classification Search
    CPC ......... C23C 18/00; C23C 18/04; C23C 38/00; C22C 18/00; C22C 18/04; C22C 38/00; B32B 15/01; B32B 15/013; B32B 15/04; B32B 15/043; B32B 15/18; Y10T 428/12799; Y10T 428/12951; Y10T 428/12972; Y10T 428/12993
    See application file for complete search history.

(56) References Cited

U.S. PATENT DOCUMENTS

| | | |
|---|---|---|
| 2010/0139816 A1 | 6/2010 | Hanlon et al. |
| 2012/0107636 A1 | 5/2012 | Diez et al. |
| 2014/0302343 A1 | 10/2014 | Maalman et al. |
| 2019/0100831 A1 | 4/2019 | Oh et al. |

FOREIGN PATENT DOCUMENTS

| | | |
|---|---|---|
| JP | 2002332555 | 11/2002 |
| JP | 2002348651 | 12/2002 |
| JP | 2011157579 | 8/2011 |
| KR | 20030028174 | 4/2003 |
| KR | 20070029267 | 3/2007 |
| KR | 20090122346 | 11/2009 |
| KR | 20140043471 | 4/2014 |
| KR | 20140051669 | 5/2014 |
| KR | 20150052376 | 5/2015 |
| KR | 20150073035 | 6/2015 |
| KR | 20150074976 | 7/2015 |
| KR | 101568548 | 11/2015 |
| KR | 20160078912 | 7/2016 |
| WO | 2010130890 | 11/2010 |

OTHER PUBLICATIONS

European Search Report—European Application No. 17885344.6, dated Dec. 3, 2019, citing KR 2015 0074976, KR 2015 0052376 and US 2014/302343.

\* cited by examiner

ALLOY-PLATED STEEL MATERIAL HAVING EXCELLENT CORROSION RESISTANCE AND HIGH SURFACE QUALITY

TECHNICAL FIELD

The present invention relates to an alloy-plated steel material that can be used in home appliances, automobiles, and construction materials and the like and, more particularly, to an alloy-plated steel material having excellent corrosion resistance and surface quality.

BACKGROUND ART

As a zinc plating method which may prevent corrosion of iron through a cathodic protection method has excellent anti-corrosion performance and is highly economical, the method has been widely used for manufacturing a steel material having high corrosion resistance properties. Particularly, in the case of a hot-dip galvanized steel material in which a plating layer is formed by dipping a steel material in melted zinc, a manufacturing method may be simplified as compared to an electrical zinc plated steel material, and a price of a hot-dip galvanized steel material may be low, such that the consumption of a hot-dip galvanized steel material has increased in overall industrial fields of vehicles, electronic appliances, construction materials, and the like.

A hot-dip galvanized steel material, plated with zinc, may have sacrificial corrosion protection properties such that, when a hot-dip galvanized steel material is exposed to a corrosion environment, zinc having reduction potential lower than reduction potential of iron may be corroded first, and the corrosion of a steel material may be prevented. Also, a hot-dip galvanized steel material may form a dense corrosion product on a surface of a hot-dip galvanized steel material as zinc of a plating layer is oxidized, and the steel material may be protected from an oxidization atmosphere such that corrosion resistance of the steel material may improve.

However, air pollution has increased and a corrosion environment has been increasingly deteriorated due to high industrialization, and the demand for developing a steel material having more improved corrosion resistance than that of a conventional hot-dip galvanized steel material has increased due to strict regulations on saving resources and energy.

Accordingly, various researches on a technique of manufacturing a zinc alloy plated steel material which may improve corrosion resistance of a steel material by adding elements such as aluminum (Al), magnesium (Mg), and the like, to a zinc plating bath have been conducted. As an example, reference 1 discloses a technique of manufacturing a Zn—Al—Mg-based alloy-plated steel material in which Mg is additionally added to a Zn—Al plating composition system.

A general zinc plating is solidified to a Zn single phase, whereas in a zinc alloy plated steel material including Al and Mg, a Zn phase, an Mg—Zn alloy phase, an Al phase, and the like may coexist, and a difference in hardness between the phases may be great, and ionization tendencies of the phases in a corrosion environment are different from each other. Accordingly, a ratio and a combination among the phases may greatly affect mechanical and chemical properties of a plating layer.

(Reference 1) Korean Laid-Open Patent Publication No. 10-2014-0051669

DISCLOSURE

Technical Problem

An aspect of the present disclosure is to provide a Zn—Al—Mg based alloy plated steel material which may include a plating layer having excellent corrosion resistance and may have excellent surface quality, and a method of manufacturing the same.

The problems which the present discourse aims to address are not limited to the above-mentioned problems, and other unmentioned problems may be explicitly understood by a person having ordinary skill in the art based on the descriptions below.

Technical Solution

According to an aspect of the present disclosure, an alloy plated steel material having excellent corrosion resistance and surface quality is provided, the alloy plated steel material including a base iron, and a zinc alloy plated layer formed on at least one surface of the base iron, the zinc alloy plated layer comprises, by wt %, 0.5 to 2.0% of Mg, 0.5 to 2.5% of Al, and a balance of Zn and other inevitable impurities, and a surface of the zinc alloy plated layer comprises a Zn single phase of a ratio of 15% or higher by an area fraction, and an average diameter of the Zn single phase is 30 μm or greater.

According to another aspect of the present disclosure, a method of manufacturing an alloy plated steel material having excellent corrosion resistance and surface quality is provided, the method including preparing a zinc alloy plating bath comprising, by weight %, by wt %, 0.5 to 2.0% of Mg, 0.5 to 2.5% of Al, and a balance of Zn and other inevitable impurities; dipping a base iron in the zinc alloy plating bath and obtaining a plated zinc alloy plated steel material; cooling the zinc alloy plated steel material to a temperature of 430° C. or lower by spraying a cooling gas including 10 volume % or less of oxygen ($O_2$) and a balance of inert gas in a flow amount of 400 to 8000 m³/Hr; and finish-rolling the cooled zinc alloy plated steel material.

Advantageous Effects

According to an aspect of the present disclosure, a hot-dip zinc alloy plated steel material may have excellent corrosion resistance and may secure excellent surface quality at the same time.

BEST MODE FOR INVENTION

Figure 1:
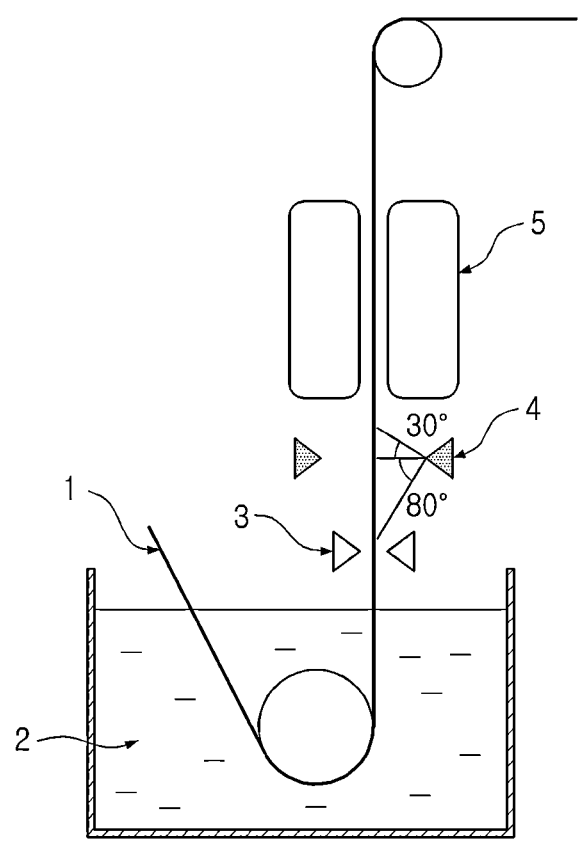
FIG. 1 is a diagram illustrating an example of a process of manufacturing an alloy plated steel material of the present disclosure.

In the description below, the present disclosure will be described in detail.

An alloy plated steel material of the present disclosure may include a base iron, and a Zn—Al—Mg based zinc alloy plated layer formed on a surface of the base iron.

The base iron may be a steel sheet or a steel wire rod, and the steel sheet may be a hot-rolled steel sheet, a cold-rolled steel sheet, and the like, and may not be particularly limited as along as the steel sheet may be used in the technical field of the present disclosure.

The zinc alloy plated layer may be formed on a surface of the base iron, and may prevent corrosion of the base iron under a corrosion environment. As a composition of the zinc alloy plated layer, the zinc alloy plated layer may include, by wt %, 0.5 to 2.0% of magnesium (Mg), 0.5 to 2.5% of aluminum (Al), and a balance of zinc (Zn) and other inevitable impurities preferably.

Mg may be very important for improving corrosion resistance of a zinc-based alloy plated steel material, and may effectively prevent corrosion of the alloy plated steel material by forming dense zinc-hydroxide based corrosion products on a surface of a plating layer under a corrosion environment. In the present disclosure, to secure a sufficient effect of corrosion resistance, a preferable content of Mg may be 0.5 wt % or higher, and a more preferable content of Mg may be 0.8 wt % or higher. When the content is excessive, Mg oxidized dross may increase on a surface of a plating bath such that an effect of preventing oxidation by adding a small amount of element may be offset. To prevent this, a preferable content of Mg may be 2.0 wt % or less, and a more preferable content of Mg may be 1.7 wt % or less.

Al may prevent the formation of Mg oxide dross in a plating bath, and may react with Zn and Mg in the plating bath and may form a Zn—Al—Mg based intermetallic compound, thereby improving corrosion resistance of a plating steel material. To this end, 0.5 wt % or higher of Al may be included, and it may be more preferable to include 0.8 wt % or higher of Al. When a content of Al is excessive, weldability and phosphate treatment properties of a steel material may be deteriorated. To prevent this, 2.5 wt % or less of Al may be included, and it may be more preferable to include 2.0 wt % or less of Al.

In the present disclosure, a ratio of a Zn single phase on a surface of the zinc alloy plated layer may be 15% or higher in an area fraction, and a preferable average diameter of the Zn single phase may be 30 μm or greater. When the surface of the zinc alloy plated layer is observed using a scanning electron microscope (SEM), shapes and colors of different phases may appear distinct. A portion to be a Zn phase may include 95% or higher of a Zn phase when being analyzed through an analysis such as an SME observation, an EDS, and the like. In the EDS analysis, a Zn phase may be determined with reference to a ratio of 95% due to an effect from an adjacent phase and a small amount of Al solid soluble in a Zn phase. A Zn phase may not be completely spherical, but may have a certain area, and an average of a long axis and a short axis of the area may be an average diameter of a Zn phase.

The zinc alloy plated layer may include a mixed phase including a Zn single phase, an Mg—Zn alloy phase including an MgZn2 phase, and an Al phase. Hardness of a Zn phase may be 150 Hv or lower, but an Mg—Zn alloy phase may have high hardness, about 300 Hv. Also, as Mg has a higher ionization tendency than that of Zn, a corrosion product reaction may be performed in an Mg—Zn alloy phase in a corrosion environment. For this reason, when an excessive Mg—Zn alloy phase is present on a plating surface, unevenness may be caused in corrosion product, and brittleness breakage of the plating layer may occur, and accordingly, an effect of improving corrosion resistance by Mg may be deteriorated.

In other words, to stably perform an initial corrosion product generation process on a surface, a Zn single phase on a surface of the zinc alloy plated layer may be 15% or higher preferably. The higher the area fraction of a Zn phase, it may be more advantageous, and a preferable area fraction may be 40%, and a more preferable area fraction may be 50%. Meanwhile, the area fraction may be 100%, but in this case, it may not be easy to completely prevent the formation of an MgZn2 phase formed along an interfacial surface of a Zn phase on the plating layer.

Also, an average diameter of a Zn phase on a surface of the zinc alloy plated layer may be 30 μm or higher preferably. The greater the surface area of a Zn phase, it may be more advantageous to stably form an initial corrosion product.

A surface roughness (Ra) of the zinc alloy plated steel material may be 0.4 to 2.3 μm preferably. When the surface roughness is less than 0.4, lubricant contained on the surface of the steel sheet may not be sufficient, which may be disadvantageous to processing. When the surface roughness exceeds 2.3, surface roughness noise may increase, and breakage of the plating layer may locally occur, or there may be a dent portion such that a thickness of the plating layer may decrease, and cracks may be created in the plating layer, which may degrade corrosion resistance.

Surface gloss of the zinc alloy plated steel material may be 40 to 120 at a surface measurement angle of 20° with reference to ISO 2813. The measurement angle may be 20° because an effect affecting an exterior of a surface, such as roughness, may be the most vulnerable at this angle.

In the description below, a method of manufacturing a zinc alloy plated steel material will be described in detail. In the present disclosure, the method may include preparing a zinc alloy plating bath, dipping and plating a base iron, and a cooling process.

A zinc alloy plating bath including, by weight %, 0.5 to 2.0% of Mg, 0.5 to 2.5% of Al, and a balance of Zn and other inevitable impurities, may be prepared. A composition of the zinc alloy plating bath may not be different from the composition of the zinc alloy plated layer described above.

A base iron may be dipped in the prepared zinc alloy plating bath, and a steel material with a zinc alloy plated layer attached thereto may be obtained.

A preferable temperature of the zinc alloy plating bath may be 440 to 470° C. When the temperature of the zinc alloy plating bath is less than 440° C., flowability of the plating bath may degrade, and uniform plating may be interfered. However, when the temperature exceeds 470° C., an oxide may increase on a surface of the plating bath due to Mg oxidation in the plating bath, and erosion may be created due to Al and Mg of refractories of the plating bath. Thus, a preferable temperature may be 470° C. or lower, and a more preferable temperature may be 465° C. or lower.

A surface temperature of the base iron dipped in the plating bath may be higher than the temperature of the zinc alloy plating bath by 5 to 30° C. In the aspects of decomposition of a surface oxide and enriched Al, it may be preferable to control a temperature of the base iron to be high. Particularly, to maximize the effect of the present disclosure, it may be preferable to control a surface temperature of the base iron inlet in the plating bath to be higher than a temperature of the plating bath by 5° C., and it may be more preferable to control the temperature to be higher by 10° C. However, when a surface temperature of the base iron inlet in the plating bath is excessively high, it may be difficult to manage a temperature of a plating port, and an excessive amount of base iron element may be dissolved into the plating bath. Thus, it may be preferable to control a temperature of the base iron to not exceed 30° C., and it may be more preferable to control the temperature to not exceed 20° C.

In the plating bath, dross defects mixed as a solid phase, may be present in addition to a uniform liquid phase. Particularly, dross including an MgZn2 element as a main element may be present on a surface of the plating bath in a form of floating dross, floating on a surface of the plating bath, due to Al and Mg oxides and a cooling effect. When the dross is mixed into a surface of the plating steel material, the dross may cause plating layer defects, and may affect the formation of an Al enriched layer formed on an interfacial surface between the plating layer and the base iron. Thus, to reduce the oxide and the floating dross formed on a surface of the plating bath, it may be preferable to control an atmosphere on a surface of the plating bath to include 3 volume % or less (including 0%) of oxygen and a balance of inert gas.

Also, when a surface of the plating bath is directly exposed to external cold air, the decomposition of an intermetallic compound such as MgZn2 may not easily occur. Thus, it may be necessary to control a surface of the plating bath to not be directly exposed to external cold air.

As an example embodiment to control an atmosphere on a surface of the plating bath and to prevent the contact with cold air as described above, a cover box for stabilizing air may be installed in a position in which the base iron dipped in the plating bath is externally discharged from the plating bath. The cover box may be formed on a surface of the plating bath in the position in which the base iron is externally discharged from the plating bath, and a supply pipe for supplying an inert gas may be connected to one side of the cover box. A concentration of oxygen in the air formed around a surface of the plating bath may be 5 to 10 volume % preferably. When the oxygen concentration is less than 5 volume %, it may be difficult to form an oxide on a surface of the plating bath such that Zn and Mg may be volatilized, and when the concentration exceeds 10%, a coarse oxide may be formed.

A spaced distance (d) between the base iron and the cover box may be 5 to 200 cm preferably. When the spaced distance is less than 5 cm, a plating solution may be splashed out due to instability of air caused by vibrations of the base iron and the movement of the base iron moving in a narrow space, which may cause plating defects. When the spaced distance exceeds 200 cm, there may be a difficulty in managing oxygen concentration in the cover box.

After dipping and plating the base iron, the amount of attached plating may be adjusted, and a cooling process may be performed. To secure a Zn single phase on a surface of the zinc alloy plated layer, a cooling process may be important. FIG. is a diagram illustrating an example of a method of manufacturing a zinc alloy plated steel material, and the manufacturing method of the present disclosure will be described in detail with reference to FIG. 1. The base iron (1) dipped in a plating bath (2) may be pulled, and an amount of attached plating may be adjusted using a plating attached amount control device (3). As an example, the amount of attached plating may be adjusted by a high pressure gas contacting onto a surface, and the high pressure gas may be air, but it may be preferable to use a gas including 90 volume % or higher of nitrogen (N2) to reduce surface defects in a minimum level.

After adjusting the amount of attached plating, a cooling process may be performed using one or more of cooling means (4). One or more cooling sections may be formed by the cooling means, and a first cooling process may importantly affect surface properties of the zinc alloy plated layer, which may be related to the formation of a seed formed on a Zn phase on the surface. As a result of the research, after a steel material passes through a first cooling section by a first cooling means (4), a preferable temperature of a surface may be 430° C. or lower. When a temperature of the surface after passing through the first cooling section is 430° C. or lower, a certain amount of Zn phase may be formed on a plated surface, which may contribute to improving corrosion resistance.

To perform the cooling process, the first cooling means (4) may be positioned within 100 cm from the plating attached amount control device (3) preferably. The cooling may be performed by spraying a cooling gas including 10 volume % or less of oxygen ($O_2$) and a balance of an inert gas preferably, and a flow amount may be 400~8000 $m^3$/Hr preferably. Also, a spraying angle may be within 30° to an upper portion and within 80° to a lower portion in a direction perpendicular to the steel material preferably.

After the first cooling, if desired, a cooling process may be performed by a general sectional cooling means (5, an auxiliary cooling means) for a subsequent cooling process. There may be one or two auxiliary cooling means. The purpose of the auxiliary cooling means may be to transform the plating layer to a completely solid state before the plating layer is in contact with an upper roll. It may be required to use a filter in the auxiliary cooling such that dusts may not be mixed into a cooling gas supplied to prevent surface defects. Also, when a cooling air is drawn from external air, it may be preferable to install a cover in an external inlet portion to prevent moisture being mixed into the air when it rains, in addition to dusts.

As the air used in the auxiliary cooling means, air inside a working field or external air of a working field may be used in consideration of costs and to prevent lack of oxygen in a working space. However, to improve plated surface quality, it may be preferable to reduce oxygen concentration in the auxiliary cooling means as well. Ideally, it may be preferable to use a cooling gas including 90% or higher of nitrogen.

A bulkhead may be installed on four side surfaces or an upper surface centering on the auxiliary cooling means within a range in which the movement of the steel sheet is not interfered, and accordingly, a cooling effect may improve by converging a cooling gas on a surface of the steel material.

After the solidification of the plating layer is completed by the cooling, roughness may be implemented on a surface. Generally, roughness may be implemented by physically pressuring by rolling, and roughness of a roll may be reflected on a surface of the plating layer by giving roughness on a surface of the roll used for rolling.

DESCRIPTIONS OF SIGNS

1 . . . Base iron
2 . . . Plating bath
3 . . . Plating attached amount control device
4, 5 . . . Cooling means

MODE FOR INVENTION

In the description below, an embodiment of the present disclosure will be described in detail. The below embodiment is provided for understanding of the present disclosure, and will not limit the present disclosure.

Embodiment

As indicated in Table 1 below, a cold-rolled base iron sample having a thickness of 0.5 to 2.3 mm was plated by being dipped in a Zn plating bath containing 0.5 to 2.00 of Mg and 0.5 to 2.5% of Al, and an amount of attached plating was adjusted to 35 to 100 g/m$^2$, an amount of single side surface plating. The amount of attached plating was adjusted by applying pressure on the surface by spraying a gas using a gas nozzle.

A cooling process was performed by spraying a cooling gas in a flow amount of 420 to 7800 m$^3$ per hour to an upper portion within 30° and to a lower portion within 80° with reference to a vertical line of the base iron using a cooling nozzle from a 30 cm point of an upper portion of a nozzle controlling the amount of plating. In Table 1 below, an angle of the cooling gas was indicated by a positive (+) sign when a spraying direction was a direction of an upper portion, and was indicated by a negative (−) sign when a spraying direction was a direction of a lower portion.

After the plating layer was solidified, a rolling process was performed to give surface roughness of the plated layer by using a rolling roll having surface roughness.

Surface roughness, a ratio of a Zn phase on a surface, glossiness, corrosion resistance, and the like, of the zinc alloy plated steel material sample manufactured as above were tested, and the results were listed in Table 1.

Surface roughness was tested in a rolling direction and in a perpendicular direction three times, and an average value thereof was obtained. Surface properties of the plating layer was measured by imaging three regions using a microscope in ×300 magnification, areas of a Zn phase and an alloy phase were measured through an image analyzer, and a ratio of a Zn phase was measured. Metal glossiness of the plated surface was measured, and glossiness at an angle of 20° was listed.

In addition to the plating layer properties obtained by the measuring device, a surface defect (hereinafter, fine group defect) having a local group form, which may be identifiable by the naked eye as a degree of reflection of light is different due to a locally formed oxide or a difference in roughness on a surface, was measured. The fine group defect may not significantly affect a function of plating or corrosion resistance, but the defect may damage an exterior to the naked eye. The defect may have an area, and may have a size greater than a size observed by the naked eye, and a length of the defect may be 100 μm empirically.

To test corrosion resistance of the sample after plating, an electrostatic plating process was performed after performing a phosphate treatment under the same conditions. A thickness of the plating was 20 μm constantly. The plated surface was cut using a knife, and a corrosion test was performed. A depth of the knife was up to a surface of the base iron, and in the corrosion test, there may be various types of corrosion environments and corrosion cycles depending on a determined method. According to the result of the present disclosure, similar tendencies were obtained upon using any corrosion testing methods, and thus, in the embodiment, 6 cycles of a cycle corrosion test was performed in accordance with VDA 233-101, a delamination width of the plating layer was measured 10 times at a position of the knife on the plated surface, and the greatest delamination width was listed.

TABLE 1

| Classification | Composition (Weight %) Mg | Al | Sample Thickness (mm) | Plating Amount of Single Side Surface (g/m$^2$) | Flow Amount of Cooling (m$^3$/Hr) | Concentration of O$_2$ of Cooling Gas (%) | Spraying Angle of Cooling Gas (°) |
|---|---|---|---|---|---|---|---|
| Inventive Example 1 | 0.5 | 0.5 | 0.7 | 50 | 7800 | 1.1 | −45 |
| Inventive Example 2 | 0.8 | 0.8 | 0.7 | 37 | 5000 | 2.5 | 0 |
| Inventive Example 3 | 1 | 1 | 0.7 | 35 | 3200 | 5.4 | −35 |
| Inventive Example 4 | 1.2 | 1.2 | 0.7 | 37 | 2800 | 3.4 | −45 |
| Inventive Example 5 | 1.4 | 1.4 | 0.7 | 45 | 2200 | 4.6 | −45 |
| Inventive Example 6 | 1.4 | 1.4 | 0.7 | 46 | 1800 | 9.1 | −45 |
| Inventive Example 7 | 1.4 | 1.4 | 0.7 | 38 | 2000 | 9.8 | −45 |
| Inventive Example 8 | 1.4 | 1.4 | 0.5 | 50 | 1200 | 2.3 | +15 |
| Inventive Example 9 | 1.4 | 1.4 | 2.3 | 35 | 600 | 1.5 | −60 |
| Inventive Example 10 | 1.6 | 1.6 | 0.7 | 41 | 800 | 0.6 | −80 |
| Inventive Example 11 | 2 | 2.5 | 1 | 38 | 420 | 4.5 | +20 |
| Comparative Example 1 | 1 | 1 | 0.7 | 35 | — | 11.1 | −85 |
| Comparative Example 2 | 1.4 | 1.4 | 0.7 | 46 | 260 | 15.9 | +45 |
| Comparative Example 3 | 1.4 | 1.4 | 1.5 | 100 | 380 | 21.0 | +35 |

TABLE 1-continued

| Classification | Surface Roughness (Ra) | Ratio of Zn Phase of Surface (%) | Diameter of Zn Phase of Surface (μm) | Fine Group Defect (Count/m$^2$) | Glossiness (20°) | Width of Plating delamnation (mm) |
|---|---|---|---|---|---|---|
| Inventive Example 1 | 0.4 | 95 | 81 | None | 115 | 2.2 |
| Inventive Example 2 | 0.7 | 91 | 167 | None | 78 | 1.6 |
| Inventive Example 3 | 0.8 | 87 | 51 | None | 78 | 1.4 |
| Inventive Example 4 | 1 | 85 | 64 | None | 105 | 1.1 |
| Inventive Example 5 | 2.3 | 82 | 54 | None | 69 | 1.1 |
| Inventive Example 6 | 0.9 | 75 | 65 | None | 75 | 1.2 |
| Inventive Example 7 | 0.9 | 54 | 45 | None | 54 | 1.3 |
| Inventive Example 8 | 0.8 | 45 | 57 | None | 70 | 1.2 |
| Inventive Example 9 | 1 | 23 | 39 | None | 50 | 1.3 |
| Inventive Example 10 | 0.9 | 42 | 45 | None | 68 | 0.8 |
| Inventive Example 11 | 1 | 17 | 33 | None | 45 | 0.9 |
| Comparative Example 1 | 0.9 | 13 | 27 | 34 | 39 | 2.7 |
| Comparative Example 2 | 2.5 | 56 | 15 | 15 | 36 | 1.4 |
| Comparative Example 3 | 1.2 | 14 | 17 | 5 | 37 | 2.2 |

Figure 2:
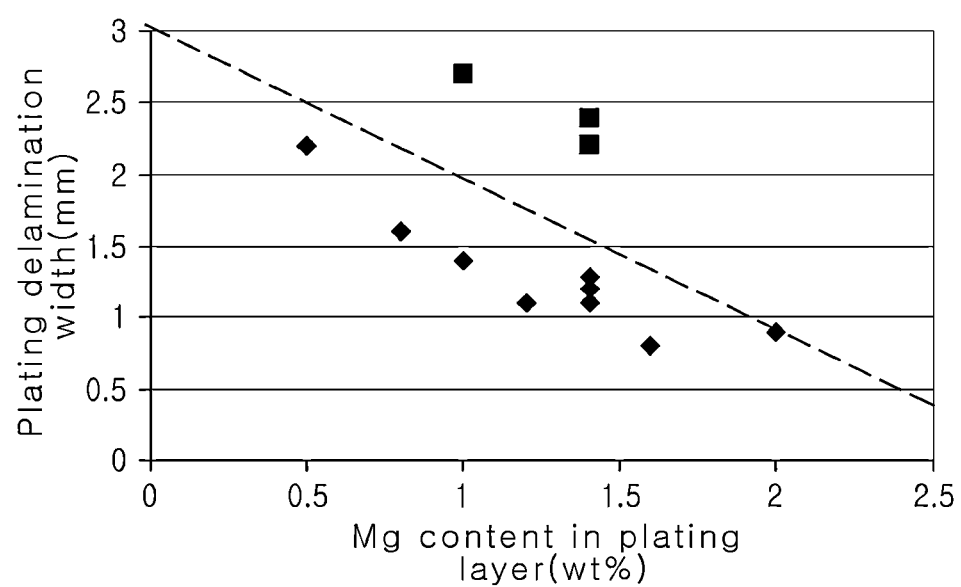
FIG. 2 is a graph illustrating a relationship between a maximum width of plating delamination and a content of Mg in a plating layer after corrosion in an example embodiment of the present disclosure.

A relationship between a maximum width of plating delamination, representing plating corrosion resistance, and a content of Mg in the plating layer after plating was indicated in FIG. 2 on the basis of the results in Table 1. A relationship between a plating delamination width and a content of Mg in the plating layer may satisfy Relational Expression 1 as below.

Plating delamination width (mm)≤−0.8×Mg content (wt %) in plating layer+3.    [Relational Expression 1]

Inventive examples 1 to 11 satisfying the conditions of the present disclosure obtained excellent surface quality and corrosion resistance after plating. However, as for comparative examples 1 to 3 which did not satisfy the conditions of the present disclosure, a ratio of a Zn phase on the plated surface was less than 15 area %, a diameter of a Zn phase was less than 30 μm, and glossiness (20°) was 40 or lower.

Figure 3:
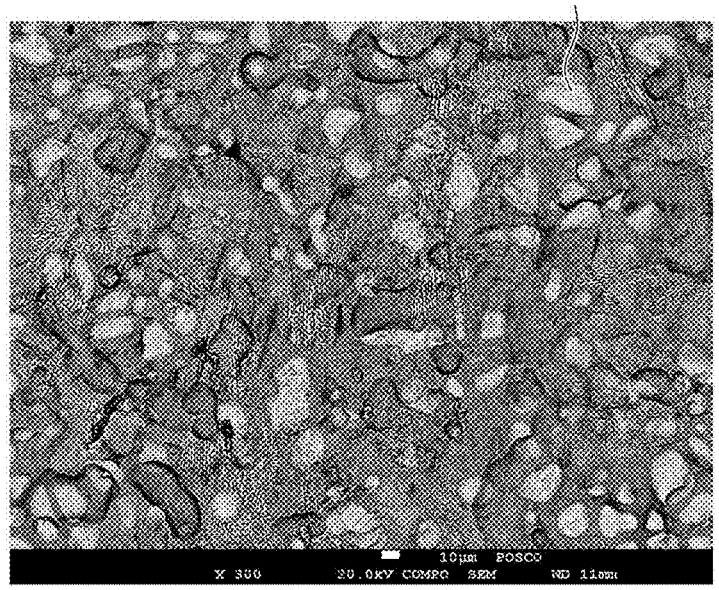
FIG. 3 is a surface image of comparative example 3 in an example embodiment of the present disclosure.
Figure 4:
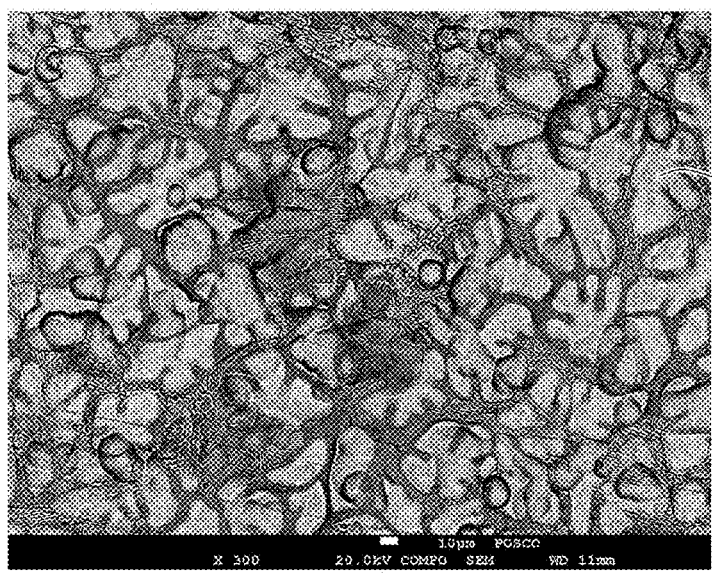
FIG. 4 is a surface image of inventive example 7 in an example embodiment of the present disclosure.

FIG. 3 is an image obtained by observing a surface of comparative example 3 above, and FIG. 4 is an image obtained by observing a surface of inventive example 7. Comparing FIG. 3 and FIG. 4, a difference in ratio of a Zn plating phase and in diameter was distinct.

The invention claimed is:

1. An alloy plated steel material having excellent corrosion resistance and surface quality, comprising:
a base iron, and a zinc alloy plated layer formed on at least one surface of the base iron,
wherein the zinc alloy plated layer comprises, by wt %, 0.5 to 2.0% of Mg, 0.5 to 2.5% of Al, and a balance of Zn and other inevitable impurities, and
a surface of the zinc alloy plated layer comprises a Zn single phase of a ratio of 15% or higher by an area fraction, and an average diameter of the Zn single phase is 30 μm or greater.

2. The alloy plated steel material of claim 1, wherein a surface roughness, Ra, of the zinc alloy plated steel material is 0.4 to 2.3 μm.

3. The alloy plated steel material of claim 1, wherein a surface gloss of the zinc alloy plated steel material is 40 to 120 at a surface measurement angle of 20° with reference to ISO 2813.

4. The alloy plated steel material of claim 1, wherein a plating delamination width of the zinc alloy plated steel material according to VDA 233-102 satisfies Relational Expression 1 below:

Plating delamination width (mm)≤−0.8×Mg content (wt %) in plating layer+3.    [Relational Expression 1]

* * * * *